(12) United States Patent
Ichikawa et al.

(10) Patent No.: US 9,283,697 B2
(45) Date of Patent: Mar. 15, 2016

(54) STRETCHED AND FOAMED PLASTIC CONTAINER AND METHOD OF PRODUCING THE SAME

(71) Applicant: TOYO SEIKAN KAISHA, LTD., Tokyo (JP)

(72) Inventors: Kentarou Ichikawa, Kanagawa (JP); Nobuhisa Koiso, Kanagawa (JP); Norio Akuzawa, Kanagawa (JP)

(73) Assignee: TOYO SEIKAN KAISHA, LTD., Tokyo (JP)

( * ) Notice: Subject to any disclaimer, the term of this patent is extended or adjusted under 35 U.S.C. 154(b) by 0 days.

(21) Appl. No.: 14/142,270

(22) Filed: Dec. 27, 2013

(65) Prior Publication Data

US 2014/0183775 A1 Jul. 3, 2014

Related U.S. Application Data

(62) Division of application No. 12/919,560, filed as application No. PCT/JP2009/055759 on Mar. 24, 2009, now Pat. No. 8,714,401.

(30) Foreign Application Priority Data

Mar. 27, 2008 (JP) ................................ 2008-083608
Mar. 31, 2008 (JP) ................................ 2008-092082
Apr. 4, 2008 (JP) ................................ 2008-097859

(51) Int. Cl.
*B29C 44/00* (2006.01)
*B29C 44/34* (2006.01)
(Continued)

(52) U.S. Cl.
CPC ................. *B29C 44/35* (2013.01); *B29B 11/08* (2013.01); *B29B 11/14* (2013.01); *B29C 49/0073* (2013.01); *B29C 49/06* (2013.01); *B65D 1/0207* (2013.01); *B65D 81/38* (2013.01); *B29B 2911/1402* (2013.01);
(Continued)

(58) Field of Classification Search
USPC ............................................................ 264/50
See application file for complete search history.

(56) References Cited

U.S. PATENT DOCUMENTS 3,221,954 A 12/1965 Lux
4,014,724 A 3/1977 Rausing
(Continued)

FOREIGN PATENT DOCUMENTS

JP 54-013567 2/1979
JP 62-18335 4/1987
(Continued)

OTHER PUBLICATIONS

Office Action in Japanese application No. 2009-074819, mail date is Aug. 27, 2013.
(Continued)

*Primary Examiner* — Jacob Thomas Minskey
(74) *Attorney, Agent, or Firm* — Greenblum & Bernstein, P.L.C.

(57) ABSTRACT

A foamed plastic container in which the cell diameters vary along a gradient so as not to decrease the content protection performance, in a manner quite different from the foamed cells distributed in the conventional foamed containers. The foamed plastic container has a container wall formed by using a plastic material and in which foamed cells are distributed, the lengths of the foamed cells in the surface direction of the container wall decreasing from the outer surface of the container toward the inner surface thereof.

7 Claims, 3 Drawing Sheets

(51) Int. Cl.

| | | |
|---|---|---|
| *B29B 11/08* | (2006.01) | |
| *B29B 11/14* | (2006.01) | |
| *B29C 49/00* | (2006.01) | |
| *B29C 49/06* | (2006.01) | |
| *B65D 1/02* | (2006.01) | |
| *B65D 81/38* | (2006.01) | |
| *B29K 23/00* | (2006.01) | |
| *B29K 25/00* | (2006.01) | |
| *B29K 27/06* | (2006.01) | |
| *B29K 27/00* | (2006.01) | |
| *B29K 33/00* | (2006.01) | |
| *B29K 55/02* | (2006.01) | |
| *B29K 67/00* | (2006.01) | |
| *B29K 69/00* | (2006.01) | |
| *B29K 71/00* | (2006.01) | |
| *B29K 77/00* | (2006.01) | |
| *B29K 105/04* | (2006.01) | |
| *B29K 105/00* | (2006.01) | |
| *B29L 31/00* | (2006.01) | |

(52) U.S. Cl.
CPC ........... *B29B 2911/1404* (2013.01); *B29B 2911/14026* (2013.01); *B29B 2911/14033* (2013.01); *B29B 2911/1498* (2013.01); *B29B 2911/14106* (2013.01); *B29B 2911/14133* (2013.01); *B29B 2911/14326* (2013.01); *B29B 2911/14333* (2013.01); *B29B 2911/14446* (2013.01); *B29B 2911/14466* (2013.01); *B29K 2023/065* (2013.01); *B29K 2023/0633* (2013.01); *B29K 2023/12* (2013.01); *B29K 2025/00* (2013.01); *B29K 2027/06* (2013.01); *B29K 2027/08* (2013.01); *B29K 2033/08* (2013.01); *B29K 2033/12* (2013.01); *B29K 2055/02* (2013.01); *B29K 2067/00* (2013.01); *B29K 2067/006* (2013.01); *B29K 2067/046* (2013.01); *B29K 2069/00* (2013.01); *B29K 2071/12* (2013.01); *B29K 2077/00* (2013.01); *B29K 2105/046* (2013.01); *B29K 2105/258* (2013.01); *B29K 2995/0025* (2013.01); *B29L 2031/7158* (2013.01); *Y10T 428/1376* (2015.01); *Y10T 428/233* (2015.01); *Y10T 428/24496* (2015.01)

(56) References Cited

U.S. PATENT DOCUMENTS

| | | | |
|---|---|---|---|
| 4,533,576 | A | 8/1985 | Tanahashi et al. |
| 5,295,800 | A * | 3/1994 | Nelson et al. ............. 425/130 |
| 6,082,563 | A | 7/2000 | Kohn et al. |
| 6,852,381 | B2 | 2/2005 | Debraal et al. |
| 2009/0026198 | A1 * | 1/2009 | Ichikawa et al. .......... 220/62.22 |
| 2010/0104785 | A1 | 4/2010 | Yamada et al. |
| 2010/0116707 | A1 | 5/2010 | Sasai et al. |

FOREIGN PATENT DOCUMENTS

| | | |
|---|---|---|
| JP | 2003-026137 | 1/2003 |
| JP | 2003-220642 | 8/2003 |
| JP | 2005-246822 | 9/2005 |
| JP | 2006-124019 | 5/2006 |
| JP | 2007-22554 | 2/2007 |
| JP | 2007-154172 | 6/2007 |
| JP | 2007-320068 | 12/2007 |
| JP | 2007-320082 | 12/2007 |

OTHER PUBLICATIONS

Japan Office action that issued with respect to patent family member Japanese patent Application No. 2008-097859, mail date is Mar. 6, 2012.

\* cited by examiner

STRETCHED AND FOAMED PLASTIC CONTAINER AND METHOD OF PRODUCING THE SAME

CROSS REFERENCE TO RELATED APPLICATION

The present application is a divisional of pending U.S. patent application Ser. No. 12/919,560, which is a national stage application of PCT/JP2009/055759, filed Mar. 24, 2009 which claims the benefit of Japanese Application Nos. 2008-083608, filed Mar. 27, 2008, 2008-092082, filed Mar. 31, 2008 and 2008-097859, filed Apr. 4, 2008. The disclosures of U.S. application Ser. No. 12/919,560, and PCT/JP2009/055759, are incorporated by reference herein their entireties.

TECHNICAL FIELD

This invention relates to a stretched and foamed plastic container having a body wall forming a foamed region where bubbles are distributed.

BACKGROUND ART

Polyester containers as represented by polyethylene terephthalate (PET) containers have now been widely used for a variety of applications owing to their excellent properties such as transparency, heat resistance, gas-barrier property, etc.

In recent years, on the other hand, it has been strongly demanded to re-use the resources. Concerning the above polyester containers, too, attempts have been made to recover the used containers and re-use them as a recycled resin for a variety of applications. Here, as for the contents to be contained in the packaging containers, those contents that are subject to be degenerated by light, such as some kinds of beverages, medicines and cosmetics are provided being contained in opaque containers formed by using a resin composition which is obtained by blending a resin with a coloring agent such as pigment, etc. From the standpoint of re-using the resources, however, it is not desired to add a coloring agent (since the coloring agent makes it difficult to maintain the recycled resin transparent), and it has been urged to use transparent containers. Therefore, even those opaque containers adapted to containing photo-degenerative contents must be improved so as to be re-used.

In order to impart light-shielding performance (opaque property) without adding coloring agent, it can be contrived to provide a foamed container by making the bubbles present in the container wall, and various foamed plastic containers have now been proposed.

For instance, a patent document 1 is disclosing a foamed molded article in which an average size of foamed cells has a gradient, and an average size of the foamed cells present on the outer surface side is smaller than an average size of the foamed cells present in the inside thereof.

A patent document 2 discloses a plastic container having bubbles wherein when the size of the bubbles as viewed from the front surface of the container is defined by an average bubble size of long diameters and short diameters of bubbles (foamed cells), not less than 80% of bubbles have an average bubble size of not larger than 200 micrometers, and bubbles as viewed from the front surface of the container occupy an area ratio of not less than 70%.

A patent document 3 proposes a method of producing a container-like foamed molded article by injecting and filling a synthetic resin containing a foaming agent in a mold cavity which is maintained in a pressurized state with a gas to form a tubular parison (preform) having a smooth surface which is not almost foamed though the foaming agent is contained, cooling at least a portion of the surface layer of the preform, transferring the preform in a state where the inner core thereof has not been cooled yet into a large mold cavity so as to be molded and foamed by the compressed gas and/or vacuum.

A patent document 4 discloses a method of producing an integrally molded body of a partly foamed resin by utilizing the microcellular technology proposed by the present applicant. According to this production method, an integrally molded body (e.g., preform for forming a container) of a thermoplastic resin is formed, and is caused to imbibe a gas. Thereafter, the obtained gas-imbibing molded body is selectively heated so as to be selectively foamed by the formation of bubbles due to the imbibed gas, to thereby produce the integrally molded body of the partly foamed resin having foamed regions and non-foamed regions.

Patent document 1: JP-A-2005-246822
Patent document 2: JP-A-2003-26137
Patent document 3: JP-B-62-18335
Patent document 4: JP-A-2007-320082

DISCLOSURE OF THE INVENTION

Problems that the Invention is to Solve

However, if the foaming technologies proposed by the above patent documents 1 to 4 are applied to the stretched containers having walls of which the thicknesses have been decreased due to stretching such as blowing the bottles, there arouses a problem in that the content protection performance of the containers is impaired since foamed cells of large sizes are distributed in many number in the inner surfaces of the walls (on the side of the contents of the containers) and barrier property against oxygen decreases. That is, if foamed cells of large sizes are distributed on the side close to the content, gases such as oxygen and the like contained in the cells easily migrate into the content to deteriorate the content. With the container proposed by the patent document 1, in particular, foamed cells of very large sizes are formed in the container wall on the side of the content, and the content protection performance decreases conspicuously.

In order to suppress the decrease in the content protection performance, therefore, it can be contrived to form a non-foamed layer containing no foamed cell on the inside of the container wall. With this means, however, the thickness of the container wall increases unnecessarily. To attain a sufficiently large degree of light-shielding performance, in particular, the thickness of the container wall must be increased, and a number of foamed cells must be formed in the container wall in the thickness direction thereof. Forming the non-foamed layer on the inside of the container wall, however, results in a further increase in the thickness of the container wall greatly hindering the attempt for increasing the light-shielding performance.

According to a method proposed by the patent document 3, a preform is formed by so injecting a resin containing a foaming agent into a mold so that no foam is formed, and foam is formed at the time when the preform is molded into a container. This method is applied to the so-called chemical foaming. Therefore, the foamed cells have sizes that are varying to a large degree. Besides, since the container is taken out from the cavity in a state where the inner core has not been cooled yet, cell diameters vary to a large degree due to foaming caused by a decrease in the resin pressure of when taken out from the cavity and by a thermal shrinkage of the molten resin, making it difficult to obtain a container having excellent appearance and high light-shielding performance. Further, a container such as a bottle has a threaded nozzle to which a cap is to be fitted. The method of the patent document 3, however, is not capable of completely suppressing the foaming at the nozzle and, further, involves problems such as deteriorated appearance, decreased strength and decreased sealing.

The patent document 4, on the other hand, is to attain a partial foaming by selectively heating a preform imbibing an inert gas. When the foamed preform is to be stretch-molded into a container, the body wall can be selectively foamed while maintaining the nozzle non-foamed. According to this method, however, the resin on the surface of the nozzle undergoes crystallization due to the imbibed inert gas, and the nozzle which should be transparent turns into translucent making it difficult to reliably avoid such problems as deteriorated appearance and decrease of sealing due to a dimensional change in the nozzle caused by crystallization. According to this method, further, the preform that is formed is imbibing gas in the surface thereof. Namely, a step is necessary for the preform to imbibe gas in a pressurized container prior to foaming the preform, accompanied by a problem from the standpoint of productivity.

Further, with the conventional stretched and foamed polyester container having, in the container wall thereof, a foamed region formed by imbibing the inert gas and heating, the surface of the container wall (particularly, the surface of the body wall) tends to develop molding defects such as cracks and blisters in the step of heat-blowing when the foaming gas is dissolved in excess amounts in the surface of the preform.

It is, therefore, an object of the present invention to provide a stretched and foamed plastic container which effectively suppresses a decrease in the content protection performance yet maintaining a sufficient degree of light-shielding performance and a method of producing the same.

Another object of the present invention is to provide a stretched and foamed plastic container having a high degree of smoothness on the surface of the non-foamed nozzle wall while effectively preventing the generation of swirl marks on the surface of the nozzle wall or foaming in the nozzle and a method of producing the same.

A further object of the present invention is to provide a stretched and foamed container made from a polyester effectively preventing the occurrence of molding defects such as cracks and blisters in the surface of the body wall and a method of producing the same.

Means for Solving the Problems

The present inventors have newly discovered the fact that when a stretched and foamed plastic container is produced by forming a preform by injection-molding a molten resin containing a foaming agent, foaming the preform and blow-molding the preform, the injection molding being carried out under particular conditions, foamed cells are formed having cell diameter varying along a gradient quite differently from that of the known foamed containers, and have completed the present invention.

According to the present invention, there is provided a stretched and foamed plastic container having a body wall equipped with a foamed region where foamed cells are distributed, wherein said foamed cells have a length gradient that cell lengths in a stretched direction are decreasing from the foamed cells present on an outer surface side of the body wall toward the foamed cells present on an inner surface side of the body wall as compared in the same stretched direction.

According to the present invention, further, there is provided a method of producing a stretched and foamed plastic container by:

forming a preform by injecting and filling a molten resin imbibing an inert gas in a mold cavity while applying hold pressure in the mold cavity by the molten resin injected, followed by solidification by cooling, heating the preform to obtain a foamed preform, and blow-molding the foamed preform.

This production method makes it possible to produce the present foamed and stretched plastic container having a body wall forming the foamed region that has the above length gradient.

Effects of the Invention

The present stretched and foamed plastic container has an important feature in that the cell lengths (cell diameter) of the foamed cells distributed in the foamed region of the body have a length gradient that the cell lengths decrease from the outer surface of the container toward the inner surface thereof as compared in the same stretched direction. If viewed in the axial direction of the container (direction of maximum stretching), for example, the foamed cells have a maximum cell diameter on the outermost surface side of the container and have a minimum cell diameter on the innermost surface side thereof. So far as being stretched, further, the cell diameters have the length gradient in also the directions other than the axial direction of the container, too.

According to the present invention as will be understood from the cell diameters having the length gradient as described above, the foamed cells distributed on the side close to the content in the container have small cell diameters effectively suppressing the migration of gases such as oxygen from the cells into the content, and effectively suppressing the content protection performance of the container from being decreased by the presence of the foamed cells.

Further, formation of the above length gradient prevents a decrease in the content protection performance without the need of forming a non-foamed layer where no foamed cell is distributed. It is, therefore, allowed to distribute the foamed cells over the whole body wall in the thickness direction and to improve light-shielding performance by permitting a number of foamed cells to be distributed in the thickness direction while preventing a decrease in the content protection performance.

Further, the foamed cells present on the inner surface side of the container are so fine that an advantage is obtained like avoiding such an inconvenience that the content in the container infiltrates into the foamed cells due to defective foaming such as blisters or breakage of foam. Moreover, since finely foamed cells are much contained, a decrease in the strength caused by foaming is prevented yet realizing a reduced weight owing to foaming.

The stretched and foamed plastic container of the invention having the length gradient of the cell diameter as described above is produced by the above-mentioned production method. Here, a particularly important feature of this method resides in that the molten resin imbibing an inert gas is injected and filled in the mold, i.e., the molten resin is injected and filled in the mold while applying hold pressure (resin-pressure) enough therein at the time of forming a preform that is to be stretch-molded into a container. That is, the foamed preform obtained by heating and foaming the preform obtained by the above method is subjected to the stretch-molding such as blow-molding in order to produce the stretched and foamed plastic container having the above-mentioned length gradient in the foamed region in the body wall. Though the reason has not still been correctly clarified why the cell diameters of the foamed cells formed by the above method have a length gradient as described above, the present inventors presume it as described below.

That is, if injection molding is executed while applying hold pressure as described above, foaming is effectively suppressed in this step. In the foamed preform obtained by executing heat-foaming in the next step, therefore, there are formed very finely foamed cells assuming a uniform spherical shape. If the thus foamed preform is stretch-molded, the foamed cells are stretched together with the container wall in the stretched direction. Here, the outer surface of the container wall is cooled and solidified upon coming in contact with the mold. Therefore, the cells stretched in the stretched direction are fixed maintaining their shapes and, therefore, the cells possess large diameters in the stretched direction. On the inner surface side of the container wall, on the other hand, a molding pressure (blowing pressure) is applied to the cells distributed in the resin having a high temperature, and the cells are compressed by the molding pressure. It is, therefore, presumed that the cell diameters of the foamed cells distributed on the inner surface side become smaller than those of the foamed cells distributed on the outer surface side, and the above length gradient is formed. On the other hand, if injection molding is executed without applying a sufficient degree of hold pressure, then a foamed preform is obtained already in this step, and the foamed cells, further, grow in the next step of heating that accompanies the blow molding, resulting in the formation of a foamed preform containing foamed cells of large sizes. Here, when the foamed preform contains foamed cells of large sizes, the above length gradient is not realized. Namely, it is presumed that the foamed cells of large sizes formed on the inner surface side at the time of stretch molding, are not easily compressed by the molding pressure such as blowing pressure; i.e., the cell diameters are not almost affected by the molding pressure.

As described above, the length gradient of cell diameters possessed by the stretched and foamed plastic container of the invention is specific to the foamed container that is obtained by executing injection molding while applying hold pressure (holding pressure) by the resin injected and by blow-molding the obtained preform after it has been heated and foamed.

In the stretched and foamed container of the invention, further, it is desired that:
(1) the foamed cells positioned on the innermost surface side of the body wall have lengths in the stretched direction which are not larger than 0.5 times of the lengths of the foamed cells positioned on the outermost surface side of the body wall in the same stretched direction; and
(2) the foamed cells positioned on the outermost surface side of the body wall have lengths not longer than 250 μm in the axial direction of the container.

Owing to these features, a decrease in the strength caused by foaming can be effectively suppressed while sufficiently suppressing a decrease in the content protection function of the container caused by foaming.

Further, in the stretched and foamed container, it is desired that:
(3) said container has a nozzle wall where no foamed cell is distributed.

Therefore, the container nozzle on where a thread is formed maintains a strength and sealing performance.

Further, when the nozzle is maintained non-foamed as described above, it is desired that:
(4) the nozzle wall has a smooth surface with a maximum height of roughness Pt (JIS-B-0601) of less than 10 m.

That is, forming a smooth surface on the nozzle wall means that foaming at a portion corresponding to the container nozzle is reliably prevented in the step of forming the preform by using the molten resin imbibing the inert gas, in the step of foaming the preform by heating, and in the step of stretch-molding the preform. Therefore, the surface of the wall of the container nozzle is prevented from developing swirl marks or from becoming translucent due to foaming. This, in other words, effectively prevents a decrease in the appearance, a decrease in the strength and a decrease in the sealing performance.

In the present container, further:
(5) a portion of the body wall is forming a foamed region where the foamed cells are distributed and other portion of the body wall is forming a non-foamed region where no foamed cell is distributed, or the number of the foamed cells present in the foamed region in the direction of thickness is differing in the direction of the surface.

When these embodiments are employed, the body of the container includes an opaque portion (foamed region) having a high light-shielding performance and a portion (non-foamed or low-foamed region) which is highly transparent, making it possible to impart an ornamental pattern to the container and to enhance its commercial value.

Most generally, the stretched and foamed container of the invention is formed by using polyester. In this polyester container, it is desired that:
(6) when the outer surface of the body wall where the foamed cells are distributed is irradiated with an infrared ray at an angle of incidence of 45 degrees relative to the outer surface relying on a total reflection absorption method by using the infrared ray and a germanium prism, the outer surface exhibits such an infrared ray absorption property that an absorbency ratio R of the reflected beams defined by the following formula is not larger than 1.30;

$$R = I_{1340}/I_{1409} \quad (1)$$

wherein $I_{1340}$ is a peak absorbency corresponding to a longitudinal oscillation mode of $CH_2$ in a region of wave numbers of $1340 \pm 2$ cm$^{-1}$, and
$I_{1409}$ is a reference peak absorbency in a region of wave numbers of $1409 \pm 2$ cm$^{-1}$.

In this embodiment, the polyester is effectively suppressed from being crystallized at the time of stretch molding and, as a result, inconveniences such as cracks in the surface of the body wall and blisters are effectively prevented at the time of stretch molding (blow molding).

According to the present production method as described above, there is obtained a stretched and foamed plastic container having a body wall forming a foamed region where foamed cells having the length gradient are distributed. According to the above production method, it is desired that:
(7) the molten resin is injected and filled in the mold cavity in which high gas-pressure (counter pressure) is maintained.

That is, upon forming a preform by injecting and filling a molten resin imbibing an inert gas in the mold cavity in which high gas-pressure is maintained while holding pressure (resin-pressure) therein, it is allowed to reliably suppress foaming in the mold (injection mold), to form homogeneously and finely foamed cells through the subsequent foaming by heating and, therefore, to obtain a stretched and foamed container having a high light-shielding performance and stable properties. Due to a partial foaming based on a selective heating, further, the foaming is avoided in a portion corresponding, for example, to the container nozzle, a smooth surface is formed on the nozzle wall, and the occurrence of swirl marks is suppressed on the surface of the nozzle wall.

According to the production method of the invention, further:

(8) a portion of the non-foamed preform that becomes the body portion of the container is selectively heated to form a foamed preform.

Therefore, the foamed regions are formed in the body and bottom portions only of the container, while the nozzle of the container is left non-foamed, making it possible to suppress a reduction in the weight of the container due to foaming and to effectively suppress a decrease in the strength.

Further, when the foamed region is to be formed in the body portion only as described above:

(9) means is employed for, further, partly and selectively heating a portion of the preform that becomes the body portion of the container.

In this case, the body portion of the container includes an opaque portion (foamed region) having a high light-shielding performance and a portion (non-foamed or low-foamed region region) which is highly transparent, making it possible to impart an ornamental pattern to the container and to enhance its commercial value.

According to the invention, further, it is desired that:

(10) when high gas-pressure (counter pressure) is maintained in the mold, the preform is formed under proper conditions of the gas-pressure and injection rate and is, thereafter, blow-molded.

Upon employing the above means, the polyester is reliably suppressed from being crystallized through the stretch molding (blow molding), and the outer surface of the body wall of the obtained container exhibits such infrared ray absorption properties that the above-mentioned absorbency R is not larger than 1.30. The container having the above infrared ray absorption properties effectively suppresses the occurrence of cracks in the surface of the body where the foamed region is formed, as described above.

Upon suitably selecting gas-pressure that is maintained high in the mold and the rate of injection, the outer surface of the container is suppressed from being excessively crystallized as described above on account of the reasons presumably as described below. If the gas-pressure in the mold and the rate of injection are not proper and, particularly, if the gas-pressure is high and the rate of injection is high, the gas that has been filled in the mold is not exhausted to a sufficient degree at the time when the resin is filled in the mold. Therefore, the molding is conducted while involving the gas between the resin and the mold, i.e., the molding is conducted in a state where the gas is dissolved to an excess degree in surface of the preform. If the gas is dissolved in the resin, it has been known that the crystallization accelerates. If the above preform is heated and stretch-molded (blow-molded), it is presumed that the crystallization accelerates on the surface of the preform accompanying the heating, and cracks occur in the outer surface of the container at the time of stretch molding.

<Stretched and Foamed Plastic Container>

Figure 1:
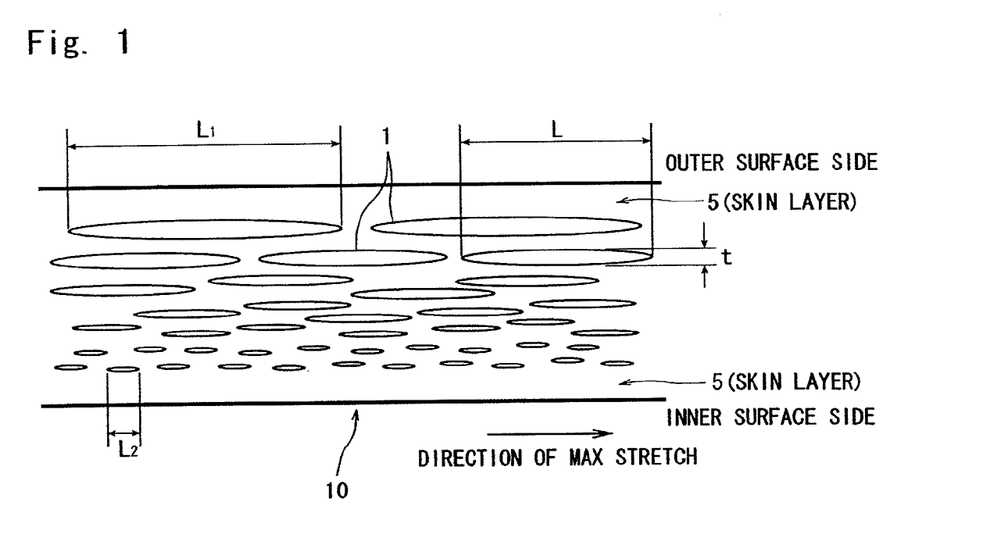
FIG. 1 is a view illustrating a sectional structure of the body wall of a stretched and foamed plastic container of the invention.

Referring to FIG. 1 schematically illustrating a sectional structure of the body wall of the container in cross section in a maximum stretched direction (axial direction of the container) of the present plastic container, foamed cells 1 are distributed in the body wall generally designated at 10. As will be learned from this drawing, the foamed cells 1 have a flat shape oriented in the maximum stretched direction, and are overlapped in a multiplicity of layers in the thickness direction.

Thin skin layers 5 where no foamed cell 1 is present are formed on the outer surface side and the inner surface side of the body wall 10.

In the present container, the length L of the formed cells 1 gradually decreases from the outer surface side toward the inner surface side of the container; i.e., the length $L_1$ of the foamed cells positioned on the outermost surface side of the container is the greatest in the stretched direction and the length $L_2$ of the foamed cells positioned on the innermost surface side thereof is the smallest. FIG. 1 is a sectional view along the maximum stretched direction, which, however, also holds in other stretched directions, too.

That is, in the invention having a length gradient of cell diameters as described above, the foamed cells are the finest on the most inner surface side of the container which is closest to the content in the container. It is, therefore, expected that the gases such as oxygen and the like present in the foamed cells are effectively suppressed from migrating into the content in the container to thereby effectively avoid a decrease in the performance for protecting the content in the container caused by the presence of foamed cells. For example, the content protection performance can be secured to a sufficient degree even without forming, in the body wall, a non-foamed layer without foamed cells.

Distributing the fine foamed cells 1 much on the inner surface side of the container as described above is advantageous even from the standpoint of preventing such a defect that the content infiltrates into the foamed cells due to defective foaming such as blisters or broken foams and, further, from the standpoint of preventing a decrease in the strength caused by foaming while decreasing the weight owing to foaming.

In the present invention, the degree of the length gradient of cell diameters (length in the surface direction) of the foamed cells also varies depending upon the thickness of the container wall 10. If an ordinary bottle (usually, having a body thickness of about 150 to about 400 μm) is considered, however, it is desired that the length $L_2$ of the foamed cells positioned on the innermost surface side of the container in the surface direction is in a range of not larger than 0.5 times and, particularly, not larger than 0.4 times of the length $L_1$ of the foamed cells positioned on the outermost surface side of the container in the stretched direction.

If the length gradient is too mild, the effect for preventing a decrease in the content protection function based on the length gradient is not exhibited to a sufficient degree. If the length gradient is too sharp or if the length $L_1$ of the foamed cells positioned on the outermost surface side of the container is too great in the stretched direction, it is estimated that the strength and gas-barrier property decrease.

It is, therefore, desired that the length $L_2$ of the cells 1 on the innermost surface side of the container in the stretched direction is not larger than 0.5 times of the length $L_1$ of the cells on the outermost surface side of the container in the stretched direction, and the length $L_1$ of the cells in the maximum stretched direction (axial direction of the container) is not larger than 250 μm. Further, the thickness t of the foamed cells 1 varies in the thickness direction, and is the greatest on the outermost surface side. Usually, however, the thickness of the foamed cells 1 on the outermost surface side is not larger than 75 μm.

The length gradient of the foamed cells 1 can be confirmed by observing the cross section of the body wall in the stretched direction by using an electron microscope. Or, the length gradient can be found from its electron microphotograph by calculating an average value of the lengths L of the foamed cells positioned on the outermost surface side or the innermost surface side of the container in the surface direction. The length gradient and the like can be adjusted by varying the foaming conditions (amount of imbibing gas, heating temperature, heating time, etc.) and the stretching conditions (blowing pressure, stretching ratio, etc.) in the steps of production that will be described later.

In the stretched and foamed plastic container of the invention, further, the number of foamed cells 1 present being overlapped in the direction of thickness of the body wall is set to be not less than 17, preferably, not less than 30 and, most preferably, not less than 50. That is, the foamed cells (i.e., bubbles) present in the wall of the plastic container exhibit refractive indexes different from that of the plastic material constituting the container wall. Upon distributing a number of foamed cells 1 in an overlapping manner in the thickness direction, therefore, light is scattered and reflected in a multiplicity of ways. As a result, the light transmission factor is suppressed and a high light-shielding performance is imparted. For example, if the foamed cells 1 of a number as described above are overlapped in a multiplicity of layers in the thickness direction thickness, the light transmission factor for a visible ray of a wavelength of 500 nm becomes not larger than 15%, particularly, not larger than 10% and, most desirably, not larger than 5%, which is a light-shielding performance of a level comparable to that of a carton for milk.

The stretched and foamed plastic container of the invention forming the foamed cells 1 in the body wall 10 is produced relying on a physical foaming by imbibing an inert gas that will be described below. Before heating the preform imbibing the inert gas to foam, a small amount of inert gas is released from the surface of the perform and, therefore, very thin skin layers 5 without containing foamed cell 1 are formed on the surface layers on the inner surface side of the container and on the outer surface side of the container. It needs not be pointed out that the thickness of the skin layers 5 can be increased by extending the time for releasing the inert gas from the surface of the preform, i.e., by permitting the inert gas to be released in increased amounts.

There is no particular limitation on the resin that constitutes the above body wall 10 (i.e., on the resin that forms the container) so far as it is capable of imbibing the inert gas, and any known thermoplastic resin can be used.

Examples of the thermoplastic resin include:

low-density polyethylene, high-density polyethylene, polypropylene, poly 1-butene and poly 4-methyl-1-pentene, or random or block copolymers of α-olefins, such as ethylene, propylene, 1-butene and 4-methyl-1-pentene, or olefin resins such as cyclic olefin copolymer;

ethylene/vinyl copolymers such as ethylene/vinyl acetate copolymer, ethylene/vinyl alcohol copolymer and ethylene/vinyl chloride copolymer;

styrene resins such as polystyrene, acrylonitrile/styrene copolymer, ABS and α-methyl styrene/styrene copolymer;

vinyl resins such as polyvinyl chloride, polyvinylidene chloride, vinyl chloride/vinylidene chloride copolymer, methyl polyacrylate and methyl polymethacrylate;

nylon 6, nylon 6-6, nylon 6-10, nylon 11 and nylon 12;

polyester resins such as polyethylene terephthalate (PET), polybutylene terephthalate, polyethylene naphthalate and copolymerized polyesters thereof;

polycarbonate resin;

polyphenylene oxide resin; and biodegradable resin such as polylactic acid.

The container may be formed by using a blend of these thermoplastic resins, as a matter of course. It is, particularly, desired to use an olefin resin or a polyester resin that is preferably used in the field of the containers. Among them, the polyester resin such as PET is most desired from the standpoint of attaining the advantage of the invention to a maximum degree.

Further, when the container is formed by using the polyester and when the infrared absorption spectrum of light reflected by the outer surface of the body wall is analyzed by the total reflection method (angle of incidence of 45 degrees) by using an infrared ray and a germanium (Ge) prism, it is desired that the absorbency ratio R defined by the following formula, $$R = I_{1340}/I_{1409} \quad (1)$$

wherein $I_{1340}$ is a peak absorbency corresponding to a longitudinal oscillation mode of $CH_2$ in a region of wave numbers of $1340 \pm 2$ cm$^{-1}$, and $I_{1409}$ is a reference peak absorbency in a region of wave numbers of $1409 \pm 2$ cm$^{-1}$, is not larger than 1.30 and, particularly, not larger than 1.25.

Figure 2:
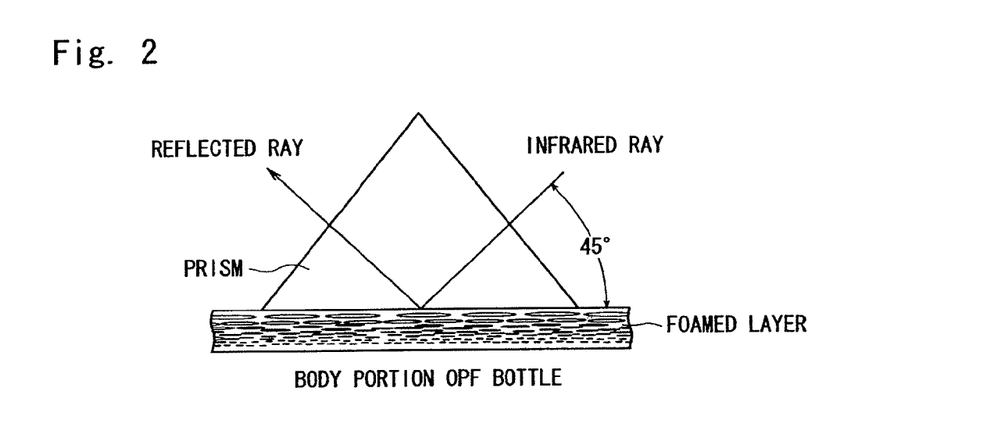
FIG. 2 is a view illustrating a principle for measuring the absorbency ratio R.
Figure 3:
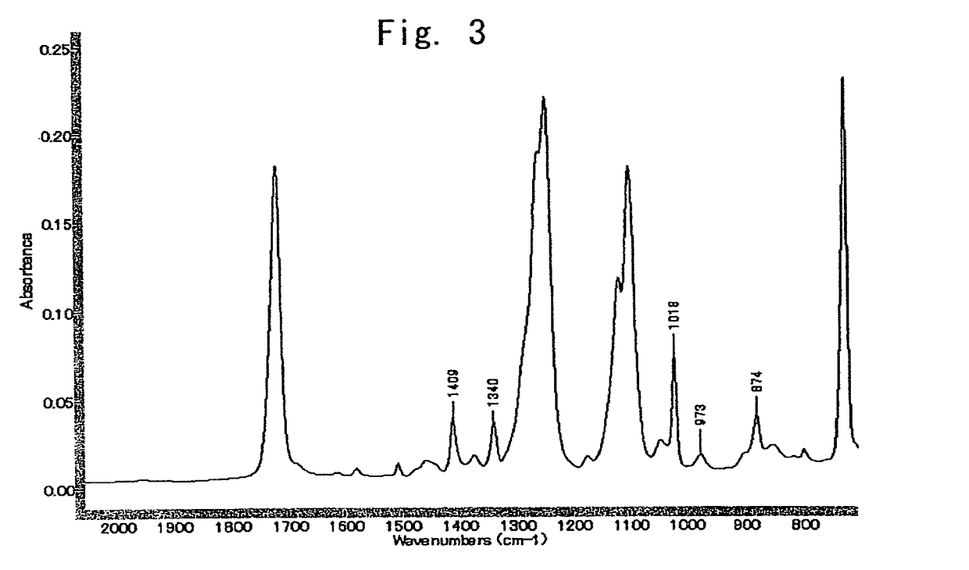
FIG. 3 is a chart of an infrared ray absorption spectrum as measured by the total reflection absorption method.

To explain the principle of measurement with reference to FIG. 2, if the infrared ray is permitted to be incident under the totally reflecting condition by pressing the Ge prism onto the surface of the sample (onto the outer surface of the body wall of the container), the infrared ray permeates into the surface of the sample (evanescent light) at a moment when the infrared ray is reflected by the surface of the sample (by the boundary between the prism and the sample) though the amount of permeation is small, and absorption takes place. The infrared ray incident on the outer surface of the sample infiltrates into the body wall from the outer surface thereof at the moment when the infrared ray is reflected by the outer surface though the amount of infiltration is small. Here, however, a non-foamed skin layer without foamed cell has been formed on the outer surface. Therefore, the infrared absorption spectrum of the reflected light is not affected by the scattering caused by the foamed cells, and the analysis of the reflected light makes it possible to obtain infrared absorption spectrum data on the surface of the sample as shown in FIG. 3. In the infrared absorption spectrum, it has been known that the peak intensity of absorbency $I_{1340}$ increases with an increase in the crystallinity while the reference peak of absorbency $I_{1409}$ is not dependent upon the orientation or crystallinity of the polyester.

As will be understood from the above description, the absorbency ratio R ($I_{1340}/I_{1409}$) that is not larger than 1.30 and, particularly, not larger than 1.25 means that the orientation and crystallization are suppressed on the outer surface of the body wall.

In the conventional stretched and foamed containers made from the polyester, for example, inert gas such as carbonic acid gas present in the preform works to accelerate the orientation and crystallization of the polyester at the time of blow molding. As a result, the absorbency ratio R ($I_{1340}/I_{1409}$) becomes not smaller than 1.3 making it difficult to prevent cracks in the surface caused by the stretch molding.

In the present container in which the absorbency ratio R ($I_{1340}/I_{1409}$) is controlled to assume a small value, on the other hand, the polyester is suppressed from being oriented or crystallized, effectively preventing the occurrence of cracks in the surface that stems from the stretch molding (blow molding). In order for the absorbency ratio R on the outer surface of the body wall to assume the above value, the rate of filling the mold cavity with the resin may be decreased.

<Production of the Stretched and Foamed Plastic Container>

The stretched and foamed plastic container has a body portion where a foamed region is formed by foamed cells having the above-mentioned length gradient, and is produced by preparing a molten resin imbibing an inert gas (step of imbibing gas), forming a non-foamed perform by injecting the molten resin imbibing the gas into a mold in a manner that the foaming does not substantially take place (step of injection molding), obtaining a foamed preform for forming a container by heating to foam the preform (step of foaming), and blow-molding the foamed preform (step of stretch blow molding).

Here, as required, a step of releasing the inert gas from the preform (step of releasing gas) may be conducted after the step of injection molding.

1. Step of Imbibing Gas;

In the step of imbibing gas, an inert gas is fed with a predetermined pressure to a melt of the above-mentioned thermoplastic resin that is maintained in a heated and melted state in the resin-mixing zone (or plasticizing zone) of the injection-molding machine. In this case, the temperature and gas pressure of the melt of the thermoplastic resin are so set that the gas is dissolved in amounts sufficient for forming a desired number of flat foamed cells 1. For example, if the temperature is high, the gas dissolves in decreased amounts but the rate of imbibition is high. If the temperature is low, the gas dissolves in increased amounts but the imbibition takes an extended period of time. If the gas pressure is high, further, the gas dissolves in increased amounts and, therefore, the foamed cells 1 are formed in increased numbers.

2. Step of Injection Molding.

In the step of injection molding, it is important to inject and fill the molten resin imbibing the inert gas in the cavity of the mold while holding pressure. Upon employing this means, foaming is suppressed in the mold, and finely foamed cells (1a) are homogeneously formed in the subsequent step of foaming.

The injection and filling while holding pressure are to further continue the injection after a predetermined amount of the molten resin is injected into the cavity of the mold. Therefore, the molten resin is pressurized in the mold to effectively suppress the foaming.

That is, upon holding pressure, the preform obtained by the above method is effectively suppressed from foaming after having been injected and filled, and has a high degree of transparency and exhibits a light transmission factor of not lower than 75% for a visible ray of a wavelength of 500 nm despite it is imbibing the gas that works as a foaming agent.

The preform obtained by the above method is in a substantially non-foamed state but is sometimes foamed to a slight degree depending on the conditions.

In the present invention, further, the interior of the mold cavity is maintained under high gas-pressure (counter pressure) and in this state, it is desired to inject and fill the molten resin imbibing gas in the cavity of the mold while holding pressure. This makes it possible to obtain a preform having a smooth surface effectively preventing the occurrence of swirl marks.

If the molten resin imbibing gas is filled in the mold maintained under the atmospheric pressure, in general, the gas imbibed in the molten resin flowing in the mold expands at the flow front of the molten resin due to a pressure differential from space in the mold, and foams are ruptured. That is, the molten resin flows in the mold in a state where the foams in the flow front are ruptured. Therefore, this state is transferred onto the surface of the mold, and swirl marks are expressed on the surface of the molded body as it is cooled and solidified on the surface of the mold becoming a cause of roughened surfaces. The foaming after having been injected and filled can be prevented by holding pressure on the molten resin filled in the mold. However, the swirl marks or the roughened surface caused by the ruptured foams while the molten resin is flowing cannot be prevented. Upon injecting the molten resin imbibing gas into the mold maintained under a gas-pressurized state, however, rupture of foams is effectively suppressed when the molten resin flows in the mold, and a preform having a very smooth surface with a maximum height Pt (JIS-B-0601) of less than 10 μm can be obtained free of swirl marks.

Figure 4:
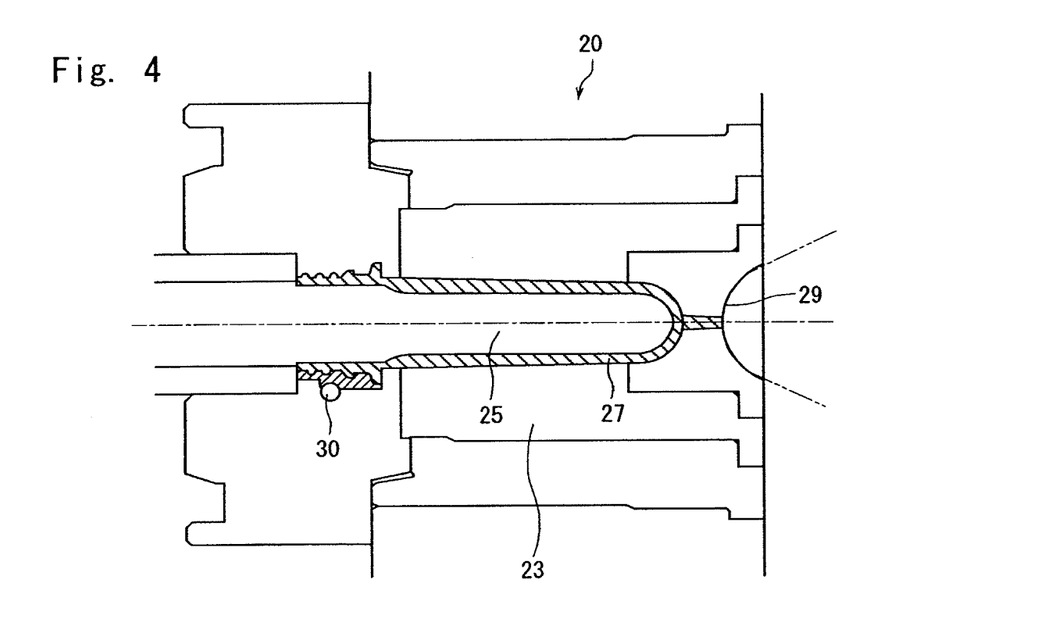
FIG. 4 is a view illustrating a step of injection molding employed for molding a preform before a step of foaming.

Referring to FIG. 4 which illustrates the injection process, the injection mold generally designated at 20 includes a shell mold 23 that is maintained cooled and a core mold 25. A cavity 27 is formed by these molds 23 and 25, and is filled with the molten resin injected from an injection nozzle 29. Further, a gas port 30 is communicated with the cavity 27 via a gas vent.

That is, the molten resin imbibing the inert gas is injected from the injection nozzle 29 and is filled in the cavity 27. Thereafter, the molten resin in the cavity 27 is cooled and solidified; i.e., the molten resin is shaped into a shape formed by the cavity 27. At the time of injecting the molten resin as described above, a nitrogen gas, a carbonic acid gas or air is fed from the gas port 30 into the cavity 27 to maintain high gas-pressure in the cavity 27. Upon filling the molten resin imbibing gas in the cavity 27 maintained under high pressure, rupture of bubbles is effectively suppressed when the molten resin flows through the cavity 27, and a molded body is obtained having a highly smooth surface preventing the occurrence of swirl marks. Here, the mold cavity 27 is assuming a highly smooth surface due to specular working. However, the portions that do not have to be particularly smooth (e.g., portions corresponding to the bottom of the container) may be partly roughened, as required, by such a method as sand-blast treatment.

The gas in the cavity 27 is exhausted through the gas port 30 as the molten resin is injected and filled. Even after the gas is exhausted, however, the pressure is applied as the molten resin is continuously injected. The pressure effectively prevents the foaming in the cavity 27.

In conducting the injection molding as described above, the degree of holding pressure (hold pressure and hold time) is suitably set depending on the content of the inert gas and the temperature of the resin so as to effectively suppress the foaming, but is, usually, so set that the weight reduction ratio is not larger than 5%. The weight reduction ratio of the preform can be found through experiment according to the following formula, $$\text{Weight reduction ratio} = [(M_0 - M_1)/M_0] \times 100$$

where $M_0$ is the weight of a preform obtained by injecting the resin without imbibing inert gas under the conditions which are so set that the molding defects such as sink mark will not occur, and $M_1$ is the weight of the gas-imbibing preform obtained from the resin imbibing inert gas.

That is, the weight reduction ratio decreases with an increase in the hold pressure (resin-pressure). Further, the weight reduction ratio decreases with an increase in the time for holding pressure (hold time). Most desirably in the invention, the conditions for holding pressure are so set that the weight reduction ratio becomes 0%.

Further, though there is no particular limitation, it is desired that the pressure in the cavity 27 is maintained, usually, in a range of not smaller than 1.0 MPa and that the molten resin is injected and filled in the cavity 27 in which the above pressure is maintained. If the pressure is small, the foams cannot be effectively suppressed from rupturing when the molten resin flows. Therefore, swirl marks occur and the surface becomes rough.

In producing the foamed container, it is a widely accepted practice not to apply hold pressure at the time of molding the preform by injection molding, or to so inject the resin as to be foamed in the injection metal mold while applying little hold pressure. At the time of producing the non-foamed plastic container, it is accepted a means to apply hold pressure at the time of molding the preform by injection molding. However, the foamed container expands due to foaming, and applying hold pressure is technically meaningless.

The thus molded preform which is substantially in the non-foamed state is blow-molded and, therefore, has the shape of a test tube.

3. Step of Foaming.

In the step of foaming, the preform which is substantially in the non-foamed state obtained above is heated and foamed by using an oil bath or an infrared heater. Due to the heating, foams develop in the preform which is substantially in the non-foamed state and in which the inert gas is remaining, and a foamed preform is obtained in which a number of foamed cells are distributed in the wall.

The heating may be conducted for the whole preform which is substantially in the non-foamed state. Upon conducting selective heating as disclosed, for example, in the above JP-A-2007-320082 (patent document 4), however, the foamed cells can be formed in the selectively heated regions only. By utilizing this, therefore, a foamed region can be formed by forming the foamed cells in only a portion that becomes the body portion of the container while leaving the container nozzle and the bottom portion to be non-foamed regions where on foamed cell is distributed. Or, the portion that becomes the body portion of the container may be only partly and selectively heated o form foamed regions and non-foamed regions in the body portion of the container. Or, the foamed region may be so formed that the degree of foaming differs in the direction of the surface of the container.

In order to reliably avoid a decrease in the strength and in the sealing performance caused by foaming in the invention, it is desired not to form foamed cells in a portion that becomes the container nozzle and leave this portion as the non-foamed region.

The heating temperature for foaming is higher than a glass transition point of the resin that forms the preform in the substantially non-foamed state. The heating brings about a sharp change in the internal energy (free energy) of the inert gas dissolved in the resin, whereby the phase separation occurs and bubbles separate away from the resin body; i.e., foaming takes place.

In order to prevent deformation of the foamed preform, the heating temperature should be lower than the melting temperature as a matter of course and, desirably, not higher than 200° C. If the heating temperature is too high, foaming occurs rapidly after having been heated. Therefore, it becomes difficult to control the cell diameter, the appearance is deteriorated, the body portion is crystallized, and the blow moldability is deteriorated.

In the foamed preform obtained as described above as will be understood from FIG. 5 which shows the sectional structure of the container wall (body wall), foamed cells $1a$ (hereinafter often referred to as spherical foamed cells) formed in the container wall $10a$ are substantially spherical and are isotropically distributed. In this step, light-shielding performance is expressed. However, there occur portions where foamed cells $1a$ of less than a predetermined number are overlapping in the thickness direction. In order to reliably attain a predetermined light-shielding performance over the whole wall forming the foamed region where foamed cells $1a$ are distributed, therefore, it is necessary to stretch the foamed cells $1a$ by stretching such as blow molding that will be described later so as to be reliably overlapped in the thickness direction. Besides, the stretched and flat cells work more to reflect light falling on the outer surface of the container to express luster of a particular and beautiful pearl tone improving the appearance of the container.

Figure 5:
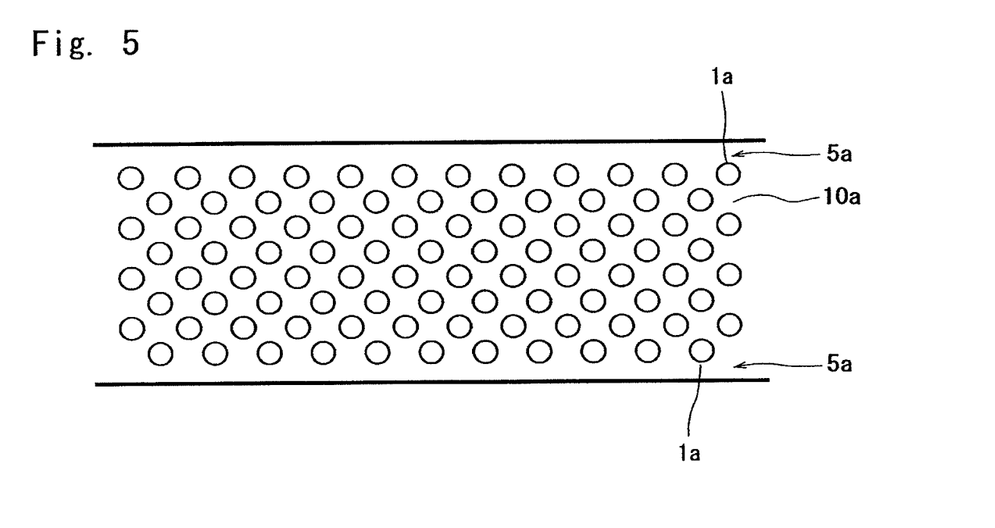
FIG. 5 is a view illustrating a sectional structure of the wall of a foamed preform from which the plastic container shown in FIG. 1 is to be produced.

The cell density of the spherical foamed cells $1a$ in the foamed region can be controlled by adjusting the molding conditions. For example, the cell density varies depending upon the amount the inert gas is dissolved. As the amount of the dissolved inert gas increases, the cell density increases and the diameter of the spherical foamed cells decreases. As the amount of the dissolved inert gas decreases, the cell density decreases and the diameter of the spherical foamed cells $1a$ increases. Further, the diameter of the spherical foamed cells $1a$ can be adjusted relying on the heating time. For instance, the diameter of the spherical foamed cells $1a$ increases with an increase in the heating time for foaming, and decreases with a decrease in the heating time. In the present invention, in particular, the foaming is effectively suppressed in the step of injection molding upon conducting the injection while holding pressure. By setting the conditions as described above, therefore, very finely foamed cells having a uniform particle size distribution can be distributed. For example, there can be distributed spherical foamed cells $1a$ maintaining a density of spherical foamed cells $1a$ of about $10^5$ to about $10^{10}$ cells/cm$^3$, having an average diameter of about 5 to about 50 μm, and having a very sharp particle size distribution of not larger than 40 μm.

4. Step of Releasing Gas.

The step of releasing gas is for forming skin layers on the preform after the above step of injection molding, and is executed as required.

As shown in FIG. 5, thin skin layers $5a$ are formed on the surfaces of the wall portion $10a$ that contains the foamed cells $1a$ therein, the skin layers $5a$ being non-foamed layers where no foamed cell $1a$ is present. That is, if the non-foamed preform imbibing the inert gas is formed and is held under the atmospheric pressure, the imbibed inert gas is released from the surface. Therefore, the amount of the inert gas becomes zero or very small in the surface portion of the preform. If heated as described above, therefore, thin skin layers $5a$ without substantially containing foamed cells $1a$ are formed in the surface portions thereof.

The surfaces (surfaces of skin layers $5a$) of the wall portion (body portion) $10a$ of the foamed preform forming the foamed region, too, have a high degree of smoothness like the surface of the preform which is substantially in the non-foamed state.

As will be understood from the above description, the thickness of the skin layers $5a$ which are the non-foamed layers can be adjusted by controlling the amount of gas released from the surface of the preform after injection-molded. By increasing the thickness of the skin layers $5a$, the container that is finally molded exhibits improved gas-barrier property. In the container of the present invention, however, the cell diameters of the foamed cells formed in the foamed region have the length gradient as described above, and the gas-barrier property is improved by the length gradient. It is, therefore, desired that the skin layers $5a$ have a very small thickness. For instance, after the injection molding, the preform is readily heated and foamed to suppress the release of gas, and the skin layers $5a$ are formed having a thickness as very small as about 1 to about 10 μm. When the light-shielding performance is not much required or when the weight of the container does not have to be much reduced, the skin layers $5a$ may be formed maintaining a large thickness to improve the strength and gas-barrier property of the container.

5. Stretch Molding.

In the present invention, the foamed preform is subjected to the step of stretch molding to obtain a desired stretched and foamed plastic container.

The stretch molding is conducted by the blow molding. That is, the preform is heated at a temperature higher than a glass transition temperature (Tg) of the resin but lower than a melting point thereof and, particularly, lower than a crystallization temperature thereof, and is stretched by the blow molding. Thus, there is obtained a foamed container in which spherical foamed cells $1a$, too, are stretched in the stretched direction and forming a foamed region where the foamed cells $1$ deformed into a flat shape are formed along the length gradient as shown in FIG. 1. For example, the stretch molding is executed by arranging a predetermined heated and foamed preform in a predetermined blowing mold, and extending a stretching rod to stretch the preform while blowing a pressurized gas such as air or nitrogen into the preform to expand and stretch the preform into the shape of a bottle.

That is, in the above blow molding, the spherical foamed cells $1a$, too, are stretched together with the container wall. Therefore, flatly foamed cells $1$ having a cell diameter elongated in the stretched direction are formed as shown in FIG. 1. As described already, however, the cells stretched in the surface direction are solidified in their shapes in the outer surface of the container wall being cooled and solidified upon coming in contact with the mold. On the inner surface side of the container wall, however, a molding pressure such as blow-molding pressure is exerted on the foamed cells $1a$ distributed in the resin having a high temperature and, therefore, the fine and spherical foamed cells $1a$ are compressed by the molding pressure. As a result, the cell diameter $L_2$ of the foamed cells $1$ on the innermost surface side of the container becomes smaller than the cell diameter $L_1$ of the foamed cells $1$ distributed on the outermost surface side, and the above-mentioned length gradient is created.

As will be understood from the above description, compressed of the spherical foamed cells $1a$ on the inner surface side of the container due to the blow-molding pressure is a phenomenon stemming from the fact that the spherical foamed cells $1a$ are formed very finely. If the spherical foamed cells $1a$ have large diameters, the crushing does not occur even on the inner surface side of the container. That is, the length gradient of cell diameters in the present invention is a phenomenon that is specifically obtained when the preform is molded by the injection molding while suppressing the foaming by holding pressure as described above, followed by foaming enabling the fine spherical foamed cells $1a$ to be homogeneously distributed, and when the preform is subjected to the blow-molding.

When the injection molding is conducted without holding pressure, for example, foaming takes place at the time of injection molding, the cell diameters of the spherical foamed cells $1a$ cannot be controlled, the cell diameters vary to a large extent and, besides, the cells of large diameters are much formed. Even by conducting the blow molding, therefore, the spherical foamed cells $1a$ are not compressed on the inner surface side of the container and, therefore, the above-mentioned length gradient of cell diameters does not occur. Further, when the stretch molding is conducted without the blow molding like the plug-assisted molding, no blowing pressure is exerted. Therefore, the spherical foamed cells $1a$ are not compressed and a predetermined length gradient does not occur, either.

In the present invention, the above-mentioned blow molding is conducted under known conditions. For example, the blow molding is so conducted that the stretching ratio becomes about 2 to about 4 times in the two directions, i.e., in the axial direction (direction of height) and in the circumferential direction and, particularly, that the body wall assumes a thickness of about 150 to about 400 μm. Here, the degree of length gradient of cell diameters can be easily adjusted by adjusting the stretching ratio or the blowing pressure depending upon the diameter and density of the spherical foamed cells $1a$ in the foamed preform. Upon increasing the stretching ratio and increasing the blowing pressure, for example, the cell diameter $L_1$ can be increased on the outermost surface side, the cell diameter $L_2$ can be decreased on the innermost surface side and the gradient of cell diameters can be steepened. In the opposite case, the length gradient of cell diameters can be loosened. Further, upon increasing the stretching ratio and, particularly, increasing the stretching ratio to be not less than 2 times, the cells are so flattened that the light is strongly reflected intensifying the luster of pearl tone.

In producing the stretched and foamed plastic container of the invention according to the above method, the glass transition point of the resin decreases linearly or exponentially with an increase in the amount of inert gas that is dissolved. Further, the viscoelasticity of the resin, too, varies as the gas dissolves. For instance, the viscosity of the resin decreases with an increase in the amount of gas that is dissolved. Therefore, the conditions should be set by taking the amount of dissolution of inert gas into consideration.

Figure 6:
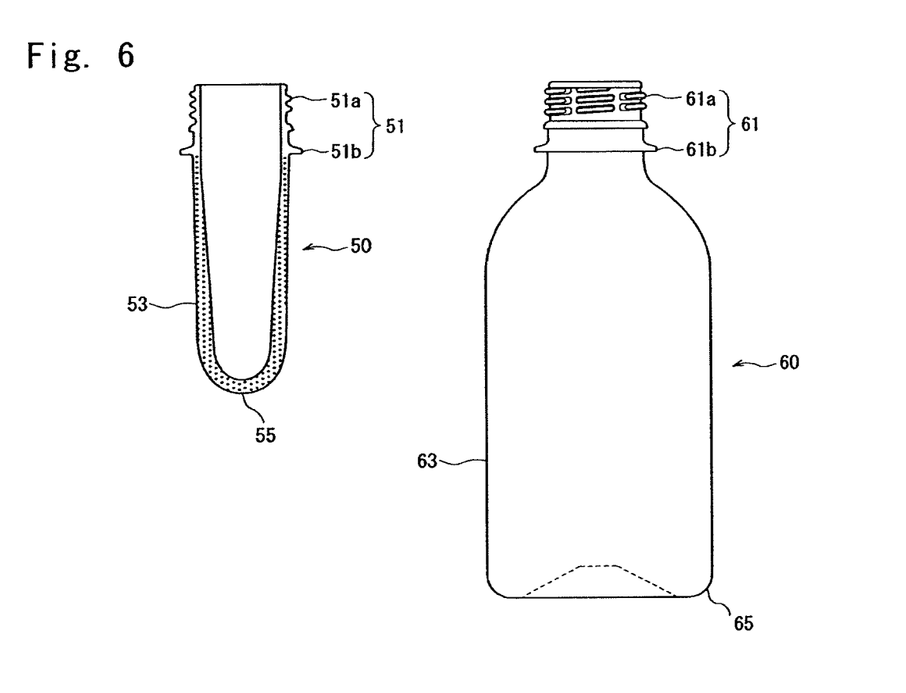
FIG. 6 is a view showing a blow-molded bottle which is a representative example of the stretched and foamed container of the invention and a preform formed in the steps of producing the bottle.

A particularly preferred stretched and foamed plastic container of the invention is produced according to a process shown in FIG. 6. That is, a foamed preform $50$ for container of the shape of a test tube is formed through the injection molding and foaming by partial heating as described above. The foamed preform $50$ includes a nozzle $51$, a body portion $53$ and a bottom portion $55$, the nozzle $51$ forming a threaded portion $51a$ and a support ring $51b$, and a portion under the support ring $51b$ being the body portion $53$. Here, the nozzle stands for, for example, a threaded portion of a bottle, a thick portion for preventing the removal of a cap of a capped bottle, or a flange portion of a cup-like container.

In the above foamed preform $50$, the body portion $53$ and the bottom portion $55$ are forming foamed regions where the spherical foamed cells $1a$ are distributed due to the selective and partial heating after the injection molding, and the nozzle $51$ is forming a non-foamed region where no foamed cell is present. Further, since a non-foamed preform is formed by injecting and filling a molten resin imbibing gas in the mold in which high gas-pressure is maintained, the foamed preform $50$ has a highly smooth surface without swirl mark as a whole, the nozzle $51$ thereof being transparent, and the body portion $53$ and the bottom portion $55$ thereof being opaque.

Therefore, a foamed plastic container $60$ obtained by blow-molding the above foamed preform $50$ has a nozzle $61$ including a threaded portion $61a$ and a support ring $61b$ (corresponding to the nozzle $51$ of the preform $50$), and a body portion $63$ and a bottom portion $65$ which are expanded and in which a number of flat foamed cells $1$ are distributed.

The nozzle $61$ of the foamed plastic container $60$ is highly transparent and has a total light transmission factor of not less than 75% as will be understood from the above description. Besides, no swirl mark is recognized on the transparent nozzle $61$ which, therefore, has a high degree of surface smoothness with its maximum height Pt (JIS-B-0601) being not more than 10 μm, preferably, not more than 5 μm and, most preferably, not more than 1 μm. The nozzle $61$ equipped with the threaded portion $61a$ requires a large strength for preventing breakage or deformation when a cap is screw-fitted thereto and for securing a high degree of sealing. The above foamed plastic container $60$ satisfies the above requirement to a sufficient degree since the nozzle 61 has no foamed cell formed therein, no swirl mark, but has a high degree of surface smoothness.

Further, the body portion 63 and the bottom portion 65 forming the foamed regions exhibit a high light-shielding performance. For example, upon forming very thin non-foamed skin layers and increasing the number of flat foamed cells 1 in the direction of thickness as described above, it is made possible to decrease the total light transmission factor of these regions to be not more than 15%, particularly, not more than 10% and, further preferably, not more than 5% to thereby impart a high light-shielding performance of a level of carton. Further, the body portion 63 and the bottom portion 65, too, have no swirl mark but have a high degree of surface smoothness like the one described above, exhibiting luster and very favorable appearance despite of being foamed.

When a high light-shielding performance is not necessary, excellent luster and appearance offer an advantage from the ornamental point of view. In this case, the foamed regions may have a total light transmission factor of about 20 to about 70%.

In the present invention, in particular, the cell diameters of foamed cells have a length gradient in the foamed regions in the body portion 63 and the bottom portion 65, the cell length decreasing from the outer surface of the container toward the inner surface thereof. Namely, finely foamed cells are present on the inner surface side of the container, which makes it possible to effectively prevent gases such as oxygen entrapped by the foamed cells 1 on the inner surface side of the container from migrating into the content in the container, i.e., to effectively prevent a decrease in the gas-barrier property due to foaming, a decrease in the content protection function and a decrease in the strength.

With a predetermined number of foamed cells being overlapped one upon the other in the thickness direction, further, an excellent light-shielding performance can be secured, enabling the container to be very useful for containing contents that may be degenerated by light. Besides, since light-shielding performance is expressed without using coloring agent, the container is excellent from the standpoint of recycling, too. Moreover, since finely foamed cells are located on the inner surface side of the container, a decrease in the weight due to foaming can be effectively suppressed, which is also advantageous particularly from the standpoint of sorting based on the difference in the specific gravity.

EXAMPLES

Excellent effects of the invention will now be described by way of the following experiments.

Experiment 1

The following examples evaluate properties stemming from the presence of foaming along a length gradient.

Example 1-1

A PET resin for bottle (intrinsic viscosity: 0.84 dl/g) was fed to an injection-molding machine, a nitrogen gas was fed in an amount of 0.15% by weight through the middle of a heating cylinder of the injection-molding machine so as to be mixed with the PET resin and dissolved therein, and the PET resin was injection-molded by so adjusting the degree of holding pressure that there took place no foaming (hold pressure of 60 MPa, hold time by the injection of 22 seconds) and was cooled and solidified to obtain a preform for container of the shape of a test tube in a substantially non-foamed state though imbibing the gas. No foamed cell was found in the obtained preform, and the weight reduction ratio was 0% as compared to when no foaming gas was added.

Next, the body portion of the preform excluding the nozzle was foamed by heating by using an infrared heater, and was readily blow-molded to obtain a foamed bottle having a capacity of about 500 ml. By using the scanning type electron microscope (SEM), the body portion of the bottle was observed for its cross section in a direction perpendicular to the up-and-down direction of the container to find that a number of fine and flat cells had been formed.

In order to closely evaluate the distribution of cell lengths, further, the foamed layer excluding thin skin layers (non-foamed layers) formed on the innermost surface side and the outermost surface side of the container in the photograph of cross section, was divided into 10 regions in the thickness direction of container wall, the divided regions were regarded from the outer surface side to be region 1, region 2, - - - region 10 (innermost surface side), and maximum lengths of the cells in the stretching direction (lengths in the axial direction of the container) present in these regions were measured to find their average values. As a result, the maximum lengths of the foamed cells in the stretching direction were decreasing from the outer surface of the container toward the inner surface thereof as shown in Table 1.

Further, a portion on the inner surface side and a portion on the outer surface side each corresponding to 20% of the thickness of the foamed layer, were sectionalized as the outer surface region (corresponds to regions 1 and 2) and the inner surface region (corresponds to regions 9 and 10), and a ratio of average cell lengths in these regions was evaluated to find that a maximum length of the foamed cells in the stretching direction on the inner surface side of the container was 0.07 times (=8.3÷118) of the length of the foamed cells located on the outer surface side, apparently showing the creation of a length gradient in the cell lengths.

TABLE 1

| | Outer surface layer | | Core layer | | Inner surface layer | |
|---|---|---|---|---|---|---|
| | region 1 | region 2 | region 5 | region 6 | region 9 | region 10 |
| Ave. cell length (μm) | 143 | 106 | 19.5 | 21.9 | 10.3 | 7.5 |
| | outer surface region | | core region | | inner surface region | |
| Ave. cell length (μm) | 118 | | 20.6 | | 8.3 | |

Example 1-2

A foamed bottle was molded in the same manner as in Example 1-1 but adding the nitrogen gas in an amount of 0.10% by weight, and was evaluated for its cell lengths.

As a result, as shown in Table 2, the maximum lengths of the foamed cells in the stretching direction were decreasing from the outer surface of the container toward the inner surface thereof like in Example 1-1. Further, a maximum length of the foamed cells in the stretching direction on the inner surface side of the container was 0.35 times (=30.5÷88.0) of the length in the surface direction of the foamed cells located on the outer surface side.

TABLE 2

| | Outer surface layer | | Core layer | | Inner surface layer | |
|---|---|---|---|---|---|---|
| | region 1 | region 2 | region 5 | region 6 | region 9 | region 10 |
| Ave. cell length (μm) | 195 | 63.0 | 64.6 | 57.9 | 35.8 | 23.5 |

| | outer surface region | core region | inner surface region |
|---|---|---|---|
| Ave. cell length (μm) | 88.0 | 60.8 | 30.5 |

Example 1-3

A foamed bottle was molded in nearly the same manner as in Example 1-2 but by also employing, in the step of injection molding, means (so-called counter pressure method) for suppressing the occurrence of defective swirl marks specific to the foaming by filling the interior of the mold with a high-pressure gas in advance, and was evaluated for its cell lengths.

As a result, as shown in Table 3, the maximum lengths of the foamed cells in the stretching direction were decreasing from the outer surface of the container toward the inner surface thereof like in Examples 1-1 and 1-2. Further, a maximum length of the foamed cells in the stretching direction on the inner surface side of the container was 0.46 times (=46.0÷99.4) of the length in the surface direction of the foamed cells located on the outer surface side.

TABLE 3

| | Outer surface layer | | Core layer | | Inner surface layer | |
|---|---|---|---|---|---|---|
| | region 1 | region 2 | region 5 | region 6 | region 9 | region 10 |
| Ave. cell length (μm) | 143 | 87.0 | 58.4 | 55.9 | 46.9 | 44.2 |

| | outer surface region | core region | inner surface region |
|---|---|---|---|
| Ave. cell length (μm) | 99.4 | 57.1 | 46.0 |

Comparative Example 1-1

A preform was formed in the same manner as in Example 1-2 but injecting the resin while so adjusting, in the step of injection molding, the amount of filling the resin and the degree of the holding pressure that the preform was foamed (hold pressure of 0.5 MPa, hold time by the injection of 2 seconds, cooling time of 20 seconds in a state without holding pressure).

Foamed cells were seen in the cross section of the obtained preform, and the weight reduction ratio of the preform was 10.5%.

Next, a foamed bottle was molded in the same manner as in Example 1-1 and was evaluated for the cell lengths. As a result, as shown in Table 4, there was seen no distinct tendency of a decrease in the cell length from the outer surface toward the inner surface unlike those of Examples 1-1 to 1-3. Besides, the cells on the inner surface side were very larger than those of Examples 1-1 to 1-3.

TABLE 4

| | Outer surface layer | | Core layer | | Inner surface layer | |
|---|---|---|---|---|---|---|
| | region 1 | region 2 | region 5 | region 6 | region 9 | region 10 |
| Ave. cell length (μm) | 423 | 434 | 285 | 260 | 276 | 321 |

| | outer surface region | core region | inner surface region |
|---|---|---|---|
| Ave. cell length (μm) | 430 | 272 | 297 |

Comparative Example 1-2

A foamed bottle was molded in the same manner as in Comparative Example 1-1 but setting the heating temperature to be low by about 10° C. before the step of blowing in an attempt to decrease the size of the foamed cells after the bottle was molded. The bottle was evaluated for its cell lengths.

As a result, as shown in Table 5, there was seen no distinct tendency of a decrease in the cell length from the outer surface toward the inner surface unlike those of Examples 1-1 to 1-3. Besides, the cells on the inner surface side were very larger than those of Examples.

TABLE 5

| | Outer surface layer | | Core layer | | Inner surface layer | |
|---|---|---|---|---|---|---|
| | region 1 | region 2 | region 5 | region 6 | region 9 | region 10 |
| Ave. cell length (μm) | 255 | 151 | 314 | 439 | 116 | 94.8 |

| | outer surface region | core region | inner surface region |
|---|---|---|---|
| Ave. cell length (μm) | 167 | 359 | 109 |

—Evaluation of Oxygen-Barrier Performance—

A non-foamed bottle obtained separately from Examples and Comparative Examples by blow-molding a preform that was injection-molded without adding foaming gas, and the bottles of Example 1-2 and Comparative Example 1-2, were evaluated for their oxygen-barrier performance.

As a result, a decrease in the oxygen-barrier performance of the bottle of Example 1-2 was 5% as compared to that of the non-foamed bottle, whereas a decrease of the bottle of Comparative Example 1-2 was as great as 70% as compared to the non-foamed bottle.

Experiment 2

The following experiment was to evaluate the effect of preventing swirl marks of when the resin was injected and filled in the mold where high gas-pressure (counter pressure) was maintained.

Experiment 2-1

Into the mold cavity maintaining pressure (counter pressure) of 1 MPa with the nitrogen gas and a temperature of 30° C., a PET resin for bottle containing the nitrogen gas in an amount of 0.1% and having an intrinsic viscosity (IV) of 0.84 dL/g was injected and, thereafter, hold pressure of 50 MPa was applied for 18 seconds. After 12 seconds have passed therefrom, the mold was opened. There was thus formed a preform for container of the shape of a test tube which contained the gas dissolved therein but which was not foamed.

By using a surface roughness measuring instrument, SURFCOM 570A (manufactured by Tokyo Seimitsu Co.), the surface roughness of the nozzle of the preform was measured for its maximum height Pt in accordance with the JIS-B-0601, and was evaluated in terms of average values at four places separated about each by 90 degrees. As a result, a maximum average height was 0.8 μm (reference length, 2.5 mm) and it was confirmed that the surface was smooth.

It was, further, confirmed by eyes that the body portion of the preform, too, possessed a smooth surface without swirl mark. By using a spectrophotometer, UV-3100PC (manufactured by Shimazu Seisakujo Co.), the nozzle cut into one-fourth was measured for its total light transmission factor over a range of wavelengths of 300 to 800 nm relying on the integrating sphere-type measuring method. As a representative example, the total light transmission factor at a wavelength of 500 nm was 85%, and a favorable light transmission property was attained.

Further, the preform was heated and blow-molded to obtain a blow-molded bottle. The nozzle of the blow bottle was transparent (a total light transmission factor of 85%) and was smooth (Pt=0.8 μm) like those of before being blow-molded. The total light transmission factor of the body portion was 9.0%, and an excellent light-shielding performance was attained.

Example 2-2

A preform was injected by the same method as that of Example 2-1 but maintaining pressure (counter pressure) of 3 MPa in the mold cavity before the injection to obtain a preform in which the gas was dissolved but which was not foamed.

The nozzle of the obtained preform was evaluated in the same manner as in Example 3 to confirm that a maximum average height was 0.6 μm (reference length, 2.5 mm) and the surface was smooth.

It was, further, confirmed by eyes that the body portion of the preform, too, possessed a smooth surface without swirl mark. The nozzle exhibited a total light transmission factor of 86%, and a favorable light transmission property was attained.

Further, the preform was heated and blow-molded to obtain a blow-molded bottle. The nozzle of the blow bottle was transparent (a total light transmission factor of 86%) and was smooth (Pt=0.6 μm) like those of before being blow-molded. The total light transmission factor of the body portion was 8.7%, and an excellent light-shielding performance was attained.

Comparative Example 2-1

A preform was injected by the same method as that of Example 2-1 but maintaining the atmospheric pressure in the mold cavity before the injection to obtain a preform in which the gas was dissolved but which was not foamed.

The surface roughness of the nozzle of the obtained preform was evaluated in the same manner as in Example 1 to confirm that a maximum average height was 10 μm (reference length, 2.5 mm) and swirl marks were observed in the whole of the preform. Further, the nozzle exhibited a total light transmission factor of 74% and was opaque.

Comparative Example 2-2

A foamed preform having a weight reduction ratio of 10% was obtained by injecting the preform under a condition of maintaining the atmospheric pressure in the mold cavity before the injection but without holding pressure.

The surface roughness of the nozzle of the obtained foamed preform was evaluated in the same manner as in Example 1 to confirm that a maximum average height was 15 μm (reference length, 2.5 mm) and swirl marks were observed in the whole of the preform. Further, the nozzle exhibited a total light transmission factor of 25% and was opaque.

Comparative Example 2-3

A preform was injected by the same method as that of Example 2-1 but setting the time for holding pressure and cooling to be 2 seconds after the injection. The surface roughness of the nozzle of the obtained preform was evaluated in the same manner as in Example 1 to confirm that a maximum average height was 0.8 μm (reference length, 2.5 mm) and that the surface was smooth. However, since the holding time and cooling was insufficient, both the nozzle and the body portion had been foamed at a moment when the preform was taken out from the mold. The nozzle exhibited a total light transmission factor of 80%.

The results of experiments in the above Examples and Comparative Examples were as shown in Table 6 below.

TABLE 6

| | Counter pressure in the cavity (MPa) | Hold pressure (MPa) | Max. ave. height Pt (μm) | Light transmission factor of nozzle (%) | Surface roughness | cells | Determination |
|---|---|---|---|---|---|---|---|
| Comp. Ex. 2-1 | 0 | 50 | 10 | 74 | X | no | X |
| Comp. Ex. 2-2 | 0 | 0 | 15 | 25 | X | no | X |
| Comp. Ex. 2-3 | 1 | 50 | 0.8 | 80 | ○ | yes | X |
| Ex. 2-1 | 1 | 50 | 0.8 | 85 | ○ | no | ○ |
| Ex. 2-2 | 3 | 50 | 0.6 | 86 | ○ | no | ○ |

Experiment 3

The following example was to evaluate the moldability by controlling the value of absorbency ratio R ($I_{1340}/I_{1409}$) by suppressing the orientation and crystallization at the time of stretch molding.

Measurement of Absorbency Ratio R ($I_{1340}/I_{1409}$)

Measurement was taken under the following conditions by using the Fourier transform infrared spectrophotometer (FTS7000e, manufactured by Varian Co.) and a one-time reflection ART with Ge prism (manufactured by Silver-Gate Systems Engineering Co.).

Angle of incidence: 45 degrees
Measured area: about 0.385 mm$^2$
Resolving power: 4 cm$^{-1}$
Range of wave numbers measured: 700 to 4000 cm$^{-1}$
Number of times of integration: 64 times Measurement was taken on the outer surface of the body portion 5 cm to 16 cm over the bottom surface of the bottle, and a maximum absorbency ratio R thereof was evaluated.

Example 3-1

A PET resin for bottle (intrinsic viscosity: 0.84 dl/g) was fed to an injection-molding machine, a nitrogen gas was fed in an amount of 0.1% by weight through the middle of a heating cylinder of the injection-molding machine so as to be mixed with the PET resin and dissolved therein, and the PET resin was injected into the mold cavity over 0.46 seconds. Thereafter, hold pressure of 50 MPa was applied for 18 seconds, and the resin was cooled and solidified to obtain a preform for container of the shape of a test tube in a substantially non-foamed state though imbibing the gas and weighing 25g. By quickly filling the interior of the cavity with the resin, foaming in the cavity could be suppressed. It was also confirmed by eyes that the preform as a whole had not been foamed.

It was also observed by eyes that swirl marks occurred in the whole of the perform.

Further, the preform was heated and blow-molded to obtain a blow-molded bottle having a capacity of about 500 ml. Relying upon the total reflection absorption method using the infrared ray and the germanium prism, the infrared ray was permitted to be incident on the outer surface of the body of the bottle at an angle of incidence of 45 degrees relative to the outer surface to evaluate the absorbency ratio R ($I_{1340}/I_{1409}$). The absorbency ratio R was 0.68.

Comparative Example 3-1

A preform was molded in the same manner as in Example 3-1 but filling the interior of the mold cavity with the air of 3 MPa (counter pressure) to, further, suppress swirl marks. The obtained preform was observed by eyes, and it was confirmed that the surface was smooth without swirl mark.

The preform was, further, heated and blow-molded to obtain a blow-molded bottle having a content of about 500 ml. In the obtained bottle, many cracks were observed in the body portion in parallel with the circumferential direction and the appearance was poor. Further, the absorbency ratio R was evaluated to be as high as 1.43.

Example 3-2

A preform was molded in the same manner as in Comparative Example 3-1 but setting the injection time to be 0.83 seconds. The obtained preform was observed by eyes, and it was confirmed that the surface was smooth without swirl mark.

The preform was, further, heated and blow-molded to obtain a blow-molded bottle having a content of about 500 ml. The obtained bottle was smooth and exhibited good appearance without crack. Further, the absorbency ratio R was evaluated to be as low as 1.06.

Example 3-3

A preform was molded in the same manner as in Comparative Example 3-1 but setting the injection time to be 1.54 seconds. The obtained preform was observed by eyes, and it was confirmed that the surface was smooth without swirl mark.

The preform was, further, heated and blow-molded to obtain a blow-molded bottle having a content of about 500 ml. The obtained bottle was smooth and exhibited good appearance without crack. Further, the absorbency ratio R was evaluated to be as low as 0.85.

Example 3-4

A preform was molded in the same manner as in Comparative Example 3-1 but setting the injection time to be 2.35 seconds. The obtained preform was observed by eyes, and it was confirmed that the surface was smooth without swirl mark.

The preform was, further, heated and blow-molded to obtain a blow-molded bottle having a content of about 500 ml. The obtained bottle was smooth and exhibited good appearance without crack. Further, the absorbency ratio R was evaluated to be as low as 0.81.

Comparative Example 3-2

A preform was molded in the same manner as in Comparative Example 3-1 but applying hold pressure of 5 MPa in the cavity of the mold. The obtained preform was observed by eyes, and it was confirmed that the surface was smooth without swirl mark.

The preform was, further, heated and blow-molded to obtain a blow-molded bottle having a content of about 500 ml. The obtained bottle developed many cracks in the body portion in parallel with the circumferential direction and the appearance was poor. Further, the absorbency ratio R was evaluated to be as high as 1.52.

Example 3-5

A preform was molded in the same manner as in Comparative Example 3-2 but setting the injection time to be 1.54 seconds. The obtained preform was observed by eyes, and it was confirmed that the surface was smooth without swirl mark.

The preform was, further, heated and blow-molded to obtain a blow-molded bottle having a content of about 500 ml. The obtained bottle was smooth and exhibited good appearance without crack. Further, the absorbency ratio R was evaluated to be as low as 0.76.

Example 3-6

A preform was molded in the same manner as in Comparative Example 3-1 but setting the injection time to be 2.35 seconds. The obtained preform was observed by eyes, and it was confirmed that the surface was smooth without swirl mark.

The preform was, further, heated and blow-molded to obtain a blow-molded bottle having a content of about 500 ml. The obtained bottle was smooth and exhibited good appearance without crack. Further, the absorbency ratio R was evaluated to be as low as 0.88.

Comparative Example 3-3

A preform was molded in the same manner as in Example 3-5 but applying hold pressure of 7 MPa to the cavity of the mold. The obtained preform was observed by eyes, and it was confirmed that the surface was smooth without swirl mark.

The preform was, further, heated and blow-molded to obtain a blow-molded bottle having a content of about 500 ml. The obtained bottle developed many cracks in the body portion in parallel with the circumferential direction and the appearance was poor. Further, the absorbency ratio R was evaluated to be as high as 1.34.

The results of experiments in the above Examples and Comparative Examples were as shown in Table 7 below.

TABLE 7

| | Counter pressure in the cavity (MPa) | Injection time (sec.) | Cracks in the surface | Absorbency ratio R |
|---|---|---|---|---|
| Ex. 3-1 | 0 | 0.46 | no | 0.68 |
| Ex. 3-2 | 3 | 0.83 | no | 1.06 |
| Ex. 3-3 | 3 | 1.54 | no | 0.85 |
| Ex. 3-4 | 3 | 2.35 | no | 0.81 |
| Ex. 3-5 | 5 | 1.54 | no | 0.76 |
| Ex. 3-6 | 5 | 2.35 | no | 0.88 |
| Comp. Ex. 3-1 | 3 | 0.46 | yes | 1.43 |
| Comp. Ex. 3-2 | 5 | 0.46 | yes | 1.52 |
| Comp. Ex. 3-3 | 7 | 1.54 | yes | 1.34 |

DESCRIPTION OF REFERENCE NUMERALS

1: foamed cells
5: skin layers
10: body wall

What is claimed is:

1. A method of forming a foamed preform including:
   forming a non-foamed preform by injecting and filling a molten resin imbibing an inert gas in a mold cavity while applying hold pressure in the mold cavity, and
   heating said non-foamed preform;
   wherein the hold pressure is set so that the weight reduction ratio is not larger than 5%, and
   the non-foamed preform is obtained by injecting and filling a molten resin imbibing an inert gas in a metal mold cavity maintaining the hold pressure therein, followed by solidification by cooling;
   wherein weight reduction ratio=$((M_0-M_1)/M_0) \times 100$, where $M_0$ is the weight of a preform obtained by injecting resin without imbibing inert gas under the conditions set so that molding defects such as sink mark will not occur, and $M_1$ is the weight of the gas-imbibing preform obtained from the resin imbibing inert gas; and
   wherein the hold pressure is pressure caused directly by addition of the molten resin to the mold cavity.

2. The method according to claim 1, wherein said molten resin is injected and filled in the mold cavity in which gas-pressure is maintained.

3. The method according to claim 1, wherein said hold pressure is applied by a degree of pressure such that the non-foamed state is maintained.

4. The method according to claim 1, wherein a portion of said non-foamed preform, which becomes a body portion of a container, is selectively heated to form a foamed preform.

5. The method according to claim 4, wherein a further part of the portion of said non-foamed preform that becomes the body portion of the container is selectively heated.

6. The method according to claim 1, wherein a nozzle of said foamed preform is left non-foamed.

7. A method of producing a stretched and foamed plastic container including:
   blow-molding a foamed preform formed by the method according to claim 1.

* * * * *